United States Patent
Stuart et al.

(10) Patent No.: US 8,713,910 B2
(45) Date of Patent: May 6, 2014

(54) INTEGRATED THRUST REVERSER/PYLON ASSEMBLY

(75) Inventors: Alan Roy Stuart, Cincinnati, OH (US); John Robert Fehrmann, Loveland, OH (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 12/533,334

(22) Filed: Jul. 31, 2009

(65) Prior Publication Data

US 2011/0023450 A1 Feb. 3, 2011

(51) Int. Cl.
*F02K 3/02* (2006.01)
*F02K 1/00* (2006.01)

(52) U.S. Cl.
USPC .............................. 60/226.2; 60/230; 60/262

(58) Field of Classification Search
USPC ................... 60/226.1, 226.2, 226.3, 230, 262
See application file for complete search history.

(56) References Cited

U.S. PATENT DOCUMENTS

| | | | |
|---|---|---|---|
| 3,820,719 A | | 6/1974 | Clark |
| 4,998,409 A | * | 3/1991 | Mutch .......................... 60/226.2 |
| 5,251,435 A | * | 10/1993 | Pauley ......................... 60/226.1 |
| 6,170,253 B1 | * | 1/2001 | Newton ....................... 60/226.2 |
| 6,546,715 B1 | * | 4/2003 | Blevins et al. ............... 60/226.2 |
| 6,584,763 B2 | * | 7/2003 | Lymons et al. .............. 60/226.2 |
| 2004/0195434 A1 | | 10/2004 | Parham |
| 2004/0245383 A1 | * | 12/2004 | Udall ............................. 244/54 |
| 2007/0294996 A1 | * | 12/2007 | Stephan et al. ............... 60/226.2 |
| 2008/0067287 A1 | | 3/2008 | Guibert et al. |
| 2008/0073461 A1 | * | 3/2008 | Guibert et al. .................. 244/54 |
| 2008/0258016 A1 | | 10/2008 | Gukeisen et al. |
| 2009/0071122 A1 | | 3/2009 | Maguire et al. |
| 2009/0094961 A1 | | 4/2009 | Stern |
| 2010/0040466 A1 | * | 2/2010 | Vauchel et al. ............ 415/213.1 |
| 2010/0107599 A1 | | 5/2010 | Vauchel |
| 2010/0170984 A1 | | 7/2010 | Journade et al. |

FOREIGN PATENT DOCUMENTS

| | | |
|---|---|---|
| EP | 1229237 A2 | 8/2002 |
| FR | 2914700 A1 | 10/2008 |
| FR | 2916737 A1 | 12/2008 |
| JP | 2008114836 A | 5/2008 |
| WO | 9612881 A1 | 5/1996 |
| WO | 2008043903 A2 | 4/2008 |

OTHER PUBLICATIONS

PCT/US2010/41638, Search Report and Written Opinion, Feb. 24, 2011.

* cited by examiner

*Primary Examiner* — Phutthiwat Wongwian
*Assistant Examiner* — Scott Walthour
(74) *Attorney, Agent, or Firm* — William Scott Andes; Gary M. Hartman; Domenica N. S. Hartman

(57) ABSTRACT

Assembly for supporting a gas turbine engine comprises a support member including mounting sites for attachment to an associated aircraft. The support member includes integral slider tracks disposed on opposed sidewalls for selective engagement with a translatable cowl. The translatable cowl is translatable along the slider tracks to selectively cover and expose a cascade thrust-reversing structure. The cascade structure includes arcuate segments mounted in hinged relationship to the support member. Rearward translation of the translatable cowl to a service position permits the cascade structure to be opened for access to the core engine.

11 Claims, 6 Drawing Sheets

INTEGRATED THRUST REVERSER/PYLON ASSEMBLY

The present invention relates generally to a thrust reverser assembly and more particularly to a thrust reverser subassembly being at least partially integrated with a pylon or other mounting structure.

Bypass engines typically employ thrust reversers for ground deceleration. Thrust reversers may be located in the fan bypass duct (the area radially between the outer nacelle and the engine core cowl and axially between the fan and the fan nozzle. Known designs include cascade and door type thrust reversers. These designs employ blocker doors with robust actuation systems to block the flow of bypass air from exiting the fan nozzle. However, known designs incorporate complex thrust reverser assemblies including drag links, latches, hinges, and supporting structure that add weight to the engine, thereby reducing efficiency.

A lighter turbofan engine subassembly to provide ground deceleration during aircraft landings and to back the aircraft away from the departure gate is desired to improve engine efficiency. Accordingly, it would be desirable to provide an integrated structure with fewer and lighter parts able to perform the desired deceleration function.

BRIEF DESCRIPTION OF THE INVENTION

The above-mentioned need or needs may be met by exemplary embodiments which provide an integrated thrust reverser/pylon assembly.

An exemplary embodiment provides an assembly comprising a support member including integral slider tracks disposed on opposed sidewalls and a cowling member selectively mountable to the support member. The cowling member is translatable along the slider tracks between at least a forward, closed position and a rearward, deployed position. The assembly also includes an openable cascade structure that is at least partially disposed in an internal cavity defined by the cowling member, when the cowling member is in the closed position. The support member includes at least one mounting site for mounting the support member to an associated aircraft.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
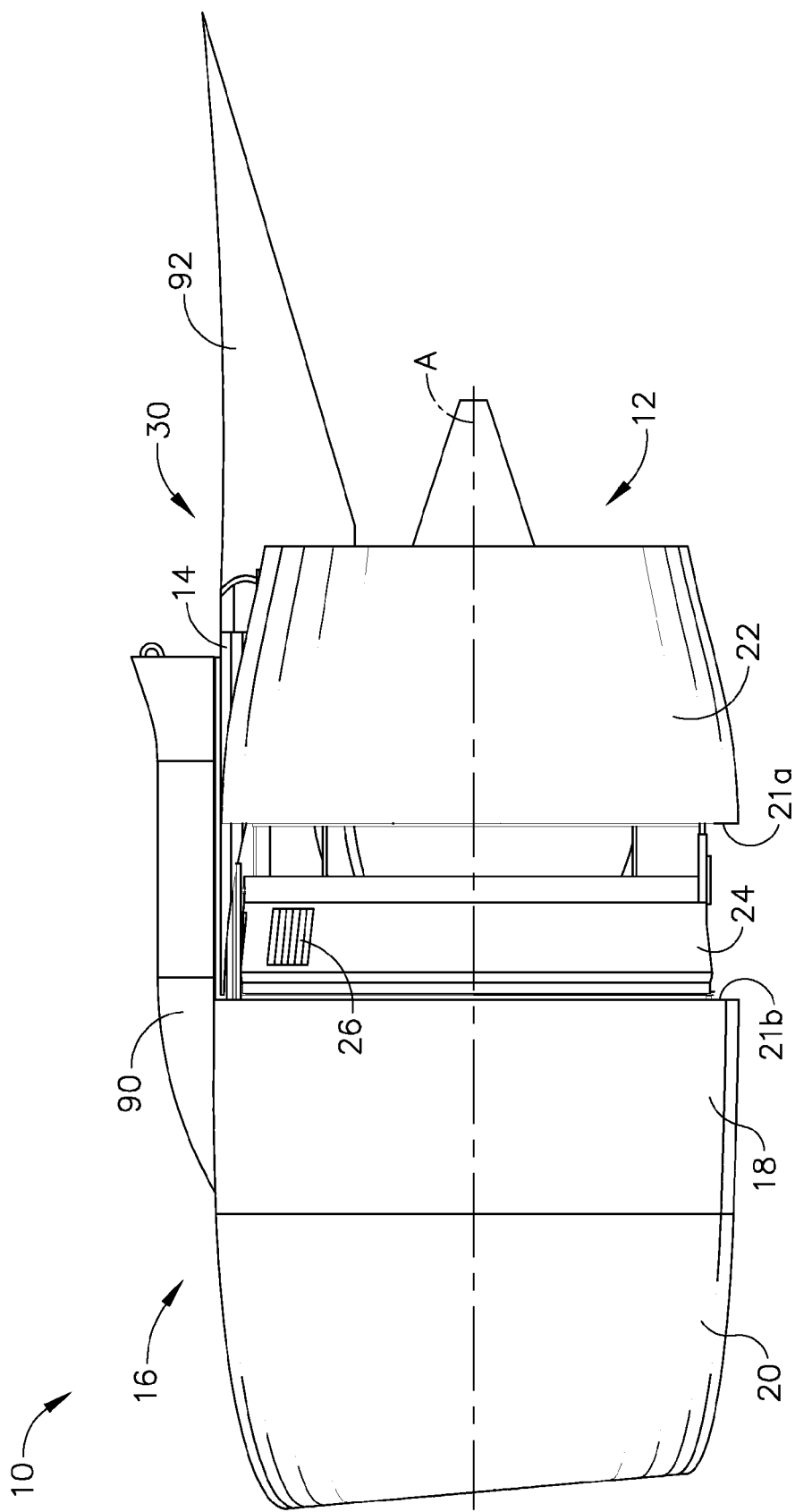
FIG. 1 is a schematic side view of an exemplary gas turbine engine assembly illustrating a translatable cowl.

Referring to the drawings wherein identical reference numerals denote the same elements throughout the various views, FIG. 1 shows an exemplary gas turbine engine assembly 10 for mounting on an associated aircraft. The engine assembly includes a gas turbine engine 12, a support member or pylon 14, and a nacelle 16 generally circumscribing portions of the gas turbine engine 12 about a longitudinal axis "A".

An exemplary engine assembly 10 includes a translatable cowl 22 operable to translate generally axially at least between a forward, closed position and a rearward, open position. A cascade structure 24 is thereby selectively covered and exposed by movement of the translatable cowl 22. Those with skill in the art will appreciate that for thrust-reversing operations, the translatable cowl 22 is rearwardly translated a distance sufficient to uncover flow directing vents, schematically represented by vents 26, in the cascade structure 24.

In an exemplary embodiment, in the forward, closed position, the translatable cowl engages a fan housing 18 to form a portion of nacelle 16. An axial v-blade/v-groove arrangement may be utilized at the junction of translatable cowl 22 and fan housing 18. For example, a v-groove element 21a may be carried at the forward end of the translatable cowl 22 while a mating v-blade element 21b is carried on the rearward end of fan housing 18. Of course this arrangement of elements may be reversed as those with skill in the art will appreciate. Fan housing 18 may be an integrated structure with inlet 20, or may comprise a separate component. In other exemplary embodiments, fan housing 18 may be formed as an openable clamshell arrangement of arcuate segments. In an exemplary embodiment, substantially all of the body structure of the translatable cowl is formed of a laminate composite material.

In an exemplary embodiment, the support member 14, translatable cowl 22 and cascade structure 24 comprise what is termed herein as an integrated pylon/thrust reverser assembly 30. During the operation of the thrust reverser, fan air from the engine fan is re-directed forward through the cascade structure to aid in decelerating the aircraft. In some embodiments, movement of the translatable cowl 22 may be coupled with movement of one or more blocker doors to direct the flow of the fan air. Other embodiments may utilize so-called blockerless arrangements to direct movement of the fan air for thrust reversal operation.

Figure 2:
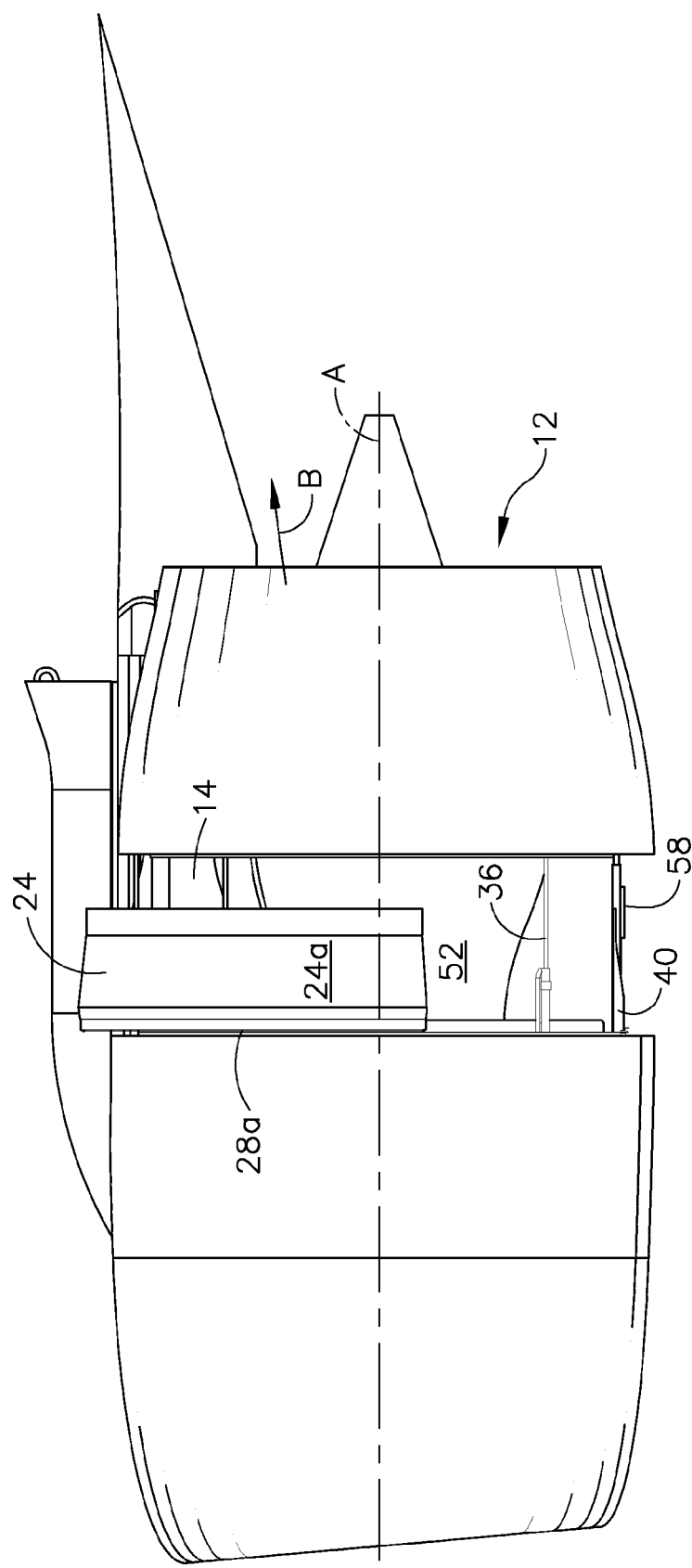
FIG. 2 is a schematic side view similar to FIG. 1 illustrating a translatable cowl and an openable cascade structure.

FIG. 1 illustrates the translatable cowl 22 in a more rearward position than would be utilized for thrust reversing operations. As illustrated in FIG. 2, the rearward position of the translatable cowl 22 offers access to the core engine, as described in greater detail below.

With continued reference to FIG. 2, in an exemplary embodiment, the cascade structure 24 is "openable" to provide access to certain portions of the gas turbine engine 12. By "openable" it is meant that at least some portion of the cascade structure 24 is operable to move away from an operational position to a serviceable position to allow at least partial access to certain engine components that may otherwise be obstructed thereby. In an exemplary embodiment, the cascade structure 24 may include mirror-image arcuate segments 24a that are split vertically in a clamshell arrangement and movable in hinged relationship relative to the support member 14. The arcuate segments may be latched or otherwise joined at opposite ends thereof to form a ring-like member when the cascade structure is in an operational position. Rods, hooks or other structures may be utilized to retain the cascade segments in the opened, serviceable position. Movement of translatable cowl 22 is independent of the cascade structure 24. Additionally, movement of each arcuate segment 24a of the cascade structure 24 is independent of movement of another segment.

In an exemplary embodiment, cascade structure 24 includes an element of a radial v-blade/v-groove attachment 28a at a forward end. In an exemplary embodiment, a fan structure such as fan case 32 (FIG. 3) carries a complementary v-blade/v-groove element 28b. In an exemplary embodiment, the cascade structure provides a v-blade element and the fan case provides a v-groove element, although these elements could be reversed.

In an exemplary embodiment, the translatable cowl 22 is adapted for translational movement along slider tracks 78, described in greater detail below. Further, in an exemplary embodiment, the translatable cowl 22 is selectively mountable relative the support member 14. Therefore, for greater access to engine components, the translatable cowl 22 is moved to a more rearward position or may be disconnected from actuating mechanism(s), such as exemplary actuating mechanism 36, or other supporting connections, such that the translatable cowl 22 may be removed away from the support member 14, as illustrated by arrow B.

In an exemplary embodiment, a cascade support structure 40 may be included at a position diametrically opposed to the support member 14.

Figure 3:
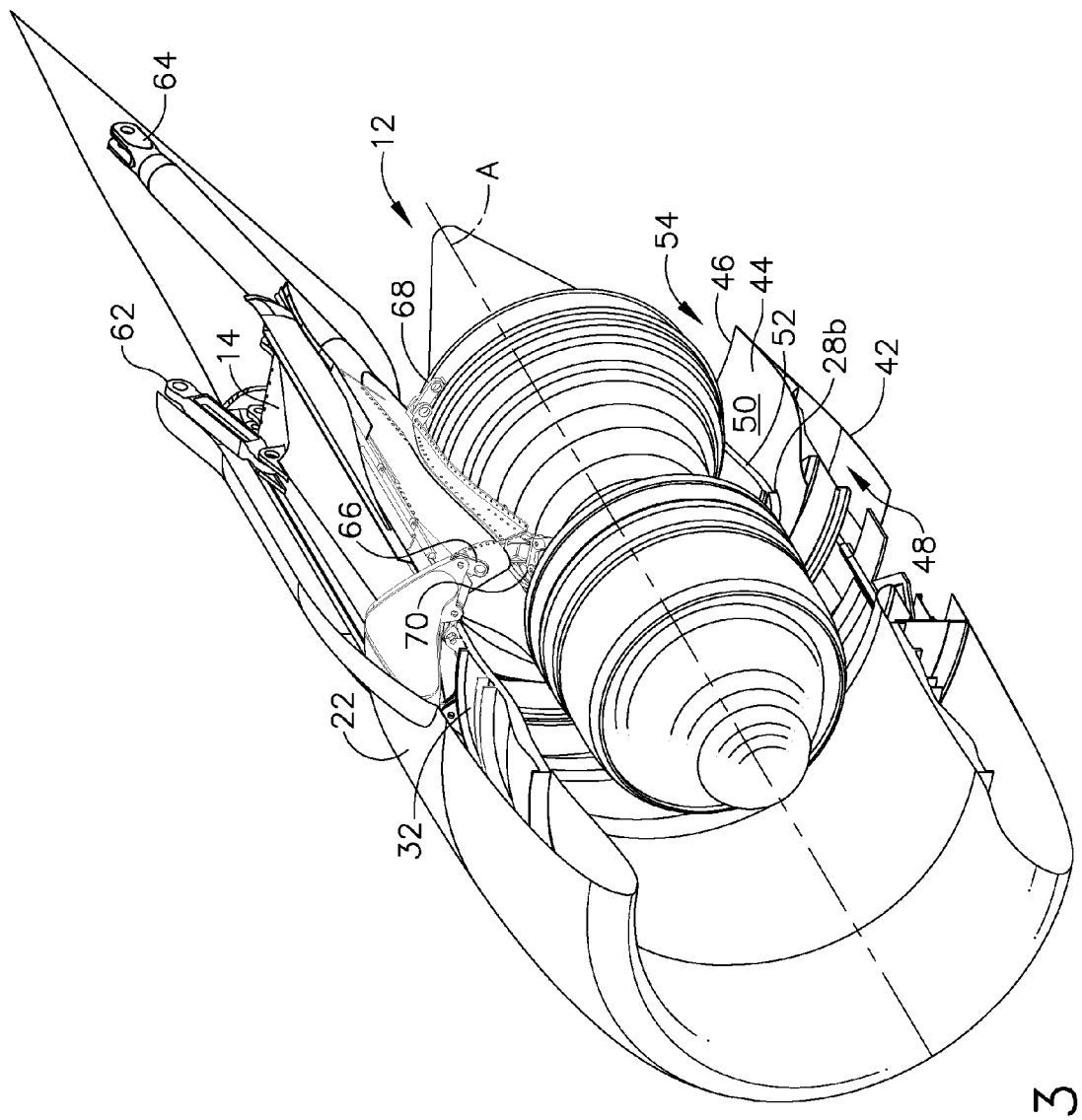
FIG. 3 is a schematic cut away view of an exemplary gas turbine engine assembly similar to FIG. 1.

With reference to FIG. 3, in an exemplary embodiment, translatable cowl 22 includes a radially outer panel 42 and a radially inner panel 44 coupled at a rearward end 46 thereof. The outer and inner panels 42, 44 are arranged to define an interior space 48 sized for reception of the cascade structure 24 (not shown in this view) when the translatable cowl 22 is in the closed position. In an exemplary embodiment, the inner panel 44 includes a surface 50 that cooperates with a core cowl 52 adapted to form at least a portion of an annular by-pass duct 54 for the gas turbine engine assembly 10 when the translatable cowl 22 is in the closed position.

Figure 5:
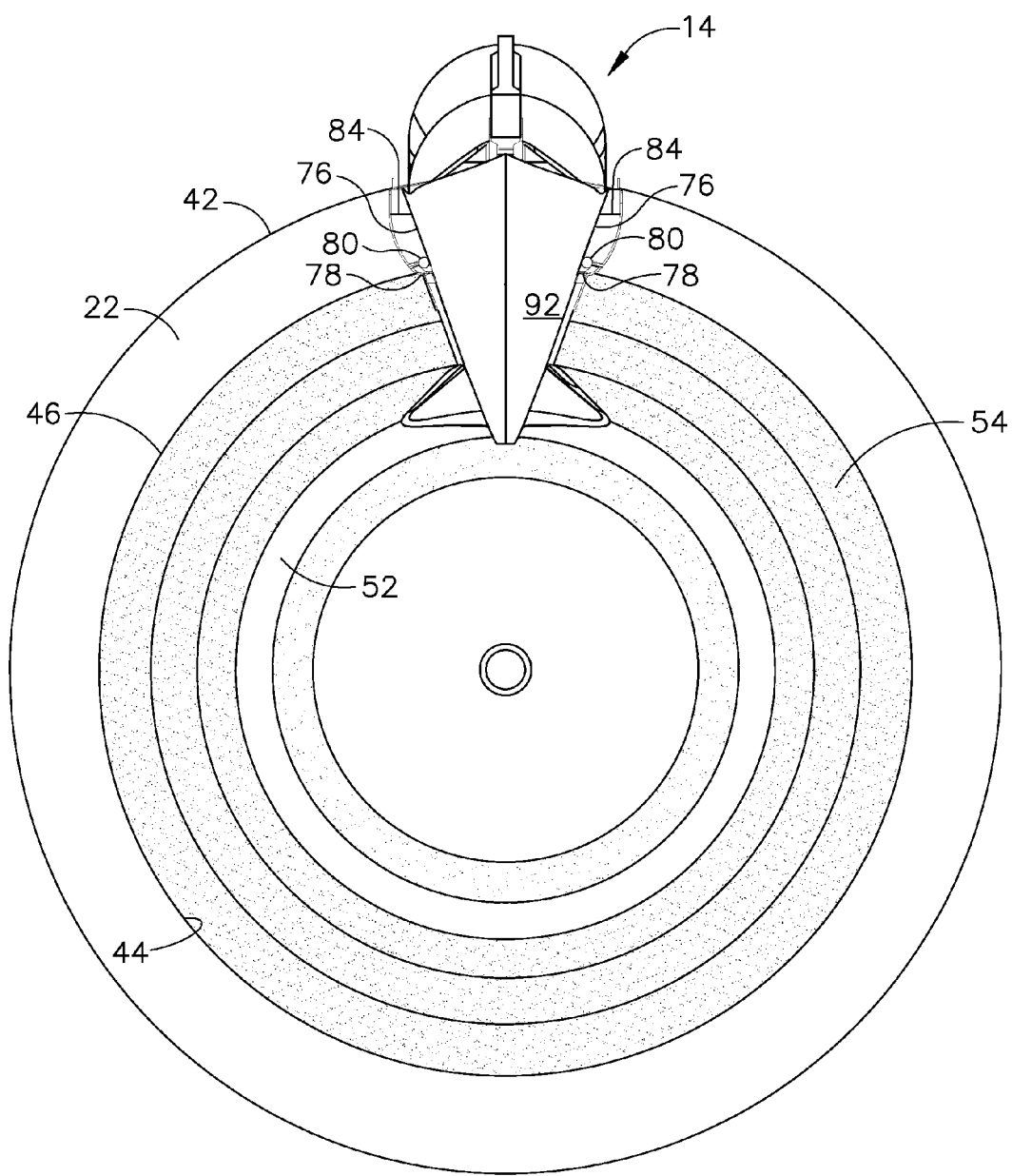
FIG. 5 is a schematic aft-looking-forward view of an exemplary gas turbine engine assembly.

In an exemplary embodiment, the cascade support structure 40 may provide a track or rail 58 (FIG. 2) to support and direct movement of the translatable cowl 22, without extending into the annular by-pass duct 54 (see also FIG. 5). Thus, in an exemplary embodiment, there is no lower bifurcation in the by-pass duct.

Figure 4:
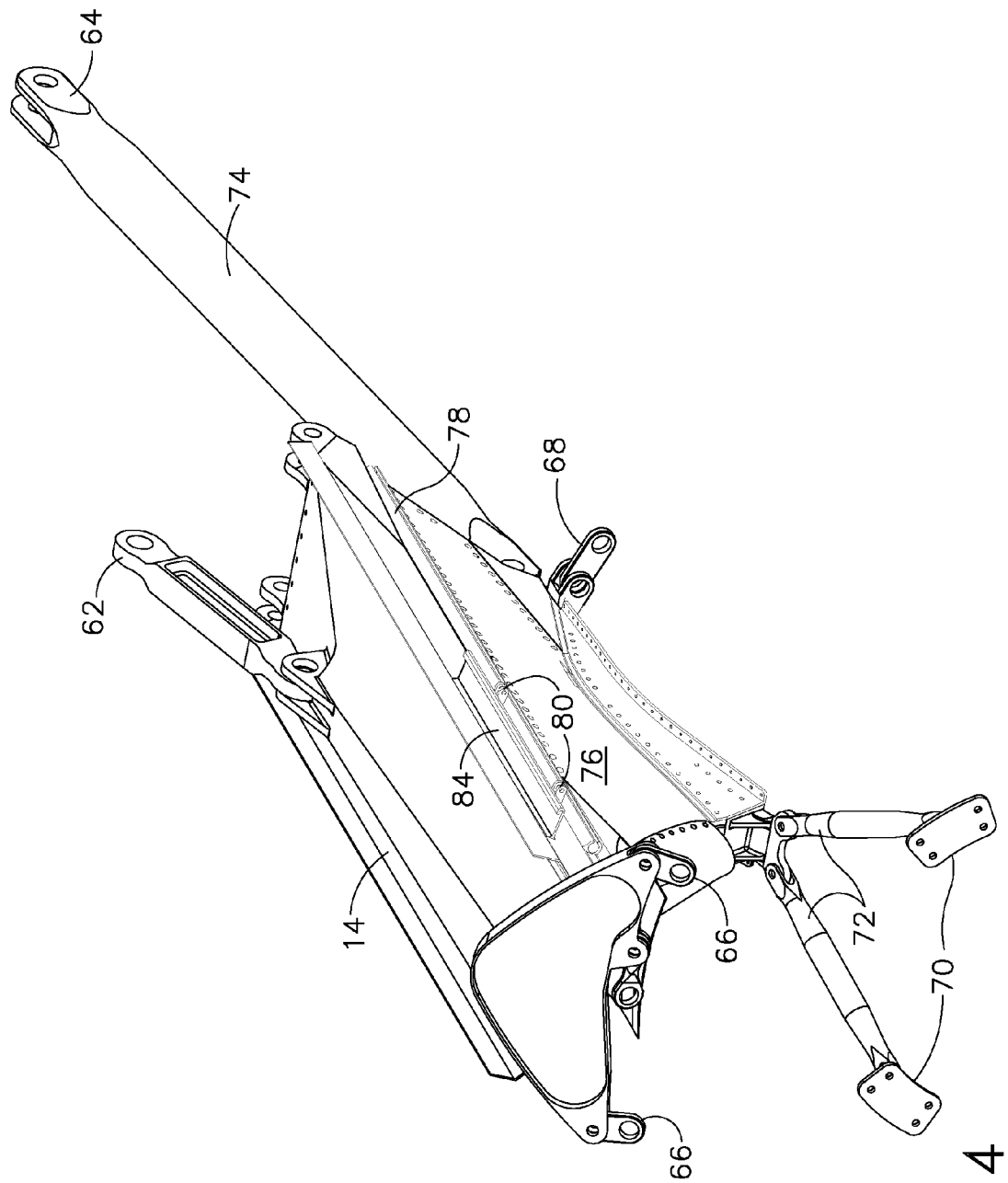
FIG. 4 is an isometric view of an embodiment of a support member.

With reference to FIGS. 3-4, an exemplary support member 14 is adapted for supported connection with an associated aircraft (not shown) at one or more mount sites 62, 64. Additionally, support member 14 includes attachment sites 66 (forward site), 68 (aft site), 70 (casing site) for supported connection with an engine 12. A plurality of force-transferring links 72, 74 are operable to transfer forces through the support member 14 to the associated aircraft.

With particular reference to FIGS. 4 and 5, an exemplary support member 14 includes opposed sidewalls 76. In an exemplary embodiment, integral slider tracks 78 for supporting and guiding translational movement of translatable cowl 22 are carried on each of the sidewalls 76. As used herein, "integral" means that certain structures are directly joined or attached, or unitarily formed with the support structure. In an exemplary embodiment, the inner panel 44 is slidably engageable with the slider tracks. In an exemplary embodiment, integral hinge mounts 80 are carried on sidewalls 76. In an exemplary embodiment, the hinge mounts 80 are disposed generally above the slider tracks 78. In an exemplary embodiment, hinge mounts 80 operate to support the cascade structure 24 in hinged relationship to the support member 14. In an exemplary embodiment, an additional guide member or shoe 84 may be utilized to slidably engage the outer panel 42 to guide and support translational movement of the translatable cowl 22. In an exemplary embodiment, the integral slider tracks 78 extend a greater longitudinal distance than the guide member 84.

With particular reference to FIGS. 1 and 5, in an exemplary embodiment, the gas turbine engine assembly includes fairings or aerodynamic surfaces to direct movement of air past the support member 14. For example, an exemplary embodiment includes a forward fairing 90 and an aft fairing 92. In an exemplary embodiment an exemplary aft fairing 92 is shorter and more compact than other fairings known in the art. Exemplary fairings may be structurally supported by the support member, or formed with or supported by other nacelle or other components.

The pylon/thrust reverser assembly disclosed herein may be mounted in various configurations to an associated aircraft. For example, the assembly may be mounted in supported connection to a wing structure, or a tail structure or other aircraft structure.

With reference to FIG. 5, in certain exemplary embodiments translatable cowl 22 defines an arcuate structure that circumferentially extends between sidewalls 76 of support structure 14 and defining a body of rotation of about 330°. In other exemplary embodiments, the body of rotation extends about 340°.

Figure 6:
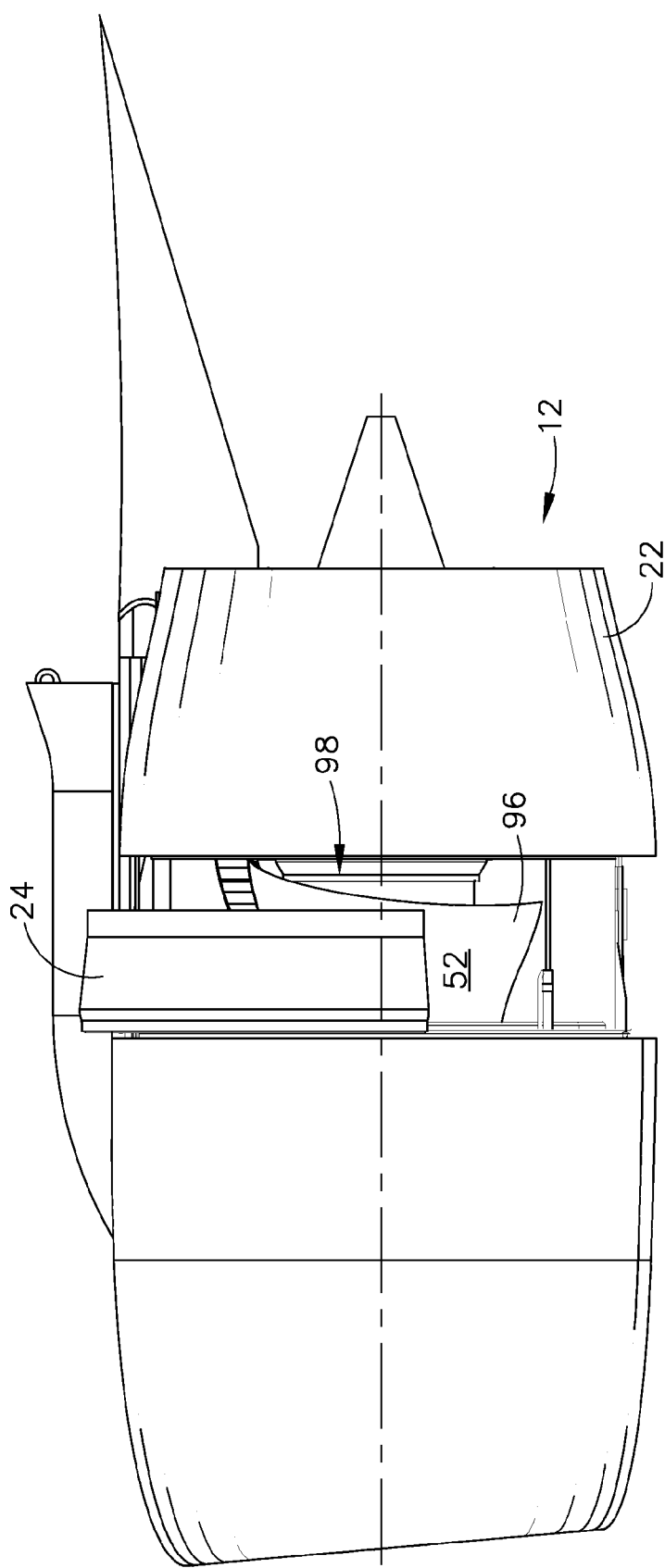
FIG. 6 is a schematic side view similar to FIG. 2 also illustrating an openable core cowl.

With reference to FIG. 6, certain integrated pylon/thrust reverser assemblies disclosed herein may be utilized with an exemplary gas turbine engines 12 including core cowls 52 having one or more doors or panels 96. The doors or panels 96 may be operable to close and open one or more openings 98 in the core cowl in order to provide service access to internal components. The core cowl doors may be hinged or otherwise movable with respect to the core cowl body. The openings may be sized, configured, and positioned to provide the desired access. In an exemplary embodiment, when the translatable cowl 22 is rearwardly displaced, the cascade structure 24 may be opened and door(s) or panel(s) 96 may be opened or moved to permit access through opening 98.

As can be appreciated from the exemplary embodiments disclosed herein, there is disclosed a thrust reverser/pylon assembly wherein certain structural elements are integral with the sidewalls of a support structure. The sidewalls are thus capable of providing a streamlined upper bifurcation in the by-pass duct of a gas turbine engine assembly. Further, the various mount sites and load-transferring linkages are operable to minimize backbone bending in the engine.

Although a combination of features is shown in the illustrated example, not all of these features are required to realize the benefits of various embodiments disclosed herein. Assemblies designed according to an embodiment of this disclosure will not necessarily include all of the features shown in any one of the Figures. Moreover, selected features of certain embodiments may be combined with certain other features of other exemplary embodiments. All such combinations are intended to be within the scope of this disclosure.

This written description uses exemplary embodiments to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   an engine assembly comprising a gas turbine engine having a core cowl, a nacelle structure surrounding the gas turbine engine, and a by-pass duct between the nacelle structure and the core cowl of the gas turbine engine; and an integrated thrust reverser/pylon sub-assembly adapted for mounting the engine assembly to an aircraft, the integrated thrust reverser/pylon assembly comprising:
a pylon including opposed sidewalls, opposed integral slider tracks disposed on the opposed sidewalls, opposed guide members disposed on the opposed sidewalls and spaced apart from the integral slider tracks, hinge mounts disposed on the opposed sidewalls between the guide members and the integral slider tracks, at least first forward and aft mounting sites connecting the pylon to the gas turbine engine, at least second forward mounting sites adapted to connect the pylon to the nacelle structure, and at least one mounting site adapted for mounting the pylon to the aircraft;
a translatable cowl comprising an arcuate body having radially inner and outer panels defining an internal cavity therebetween, the inner panels of the translatable cowl being supported by the slider tracks of the pylon and the outer panels of the translatable cowl being supported by the guide members of the pylon for translation of the translatable cowl between at least a forward, closed position and a rearward, deployed position; and
an openable cascade structure comprising arcuate cascade segments that are each mounted in hinged relationship to the pylon with the hinge mounts, wherein the cascade structure is at least partially disposed within the internal cavity when the translatable cowl is in the closed position and exposed when the translatable cowl is in the deployed position;
wherein the core cowl is disposed generally radially inward of the translatable cowl when the translatable cowl is in the forward position, and the core cowl includes at least one movable panel operable to close and open an opening in the core cowl;
wherein the sidewalls of the pylon are convergent in a radially inward direction to a lower extremity thereof adjacent the core cowl and thereby provide an upper bifurcation having an inverted triangular cross-section within the by-pass duct of the, as turbine engine; and
a track or rail, provided on a cascade support member disposed generally diametrically opposed to the pylon, to support and direct movement of the translatable cowl, wherein the track or rail does not extend into the by-pass duct; and
wherein the by-pass duct does not comprise a lower bifurcation.

2. An integrated thrust reverser/pylon assembly adapted for mounting an aircraft engine assembly to an aircraft, the aircraft engine assembly comprising a gas turbine engine having a core cowl, a nacelle structure surrounding the gas turbine engine, and a by-pass duct between the nacelle structure and the core cowl of the gas turbine engine, the integrated thrust reverser/pylon assembly comprising:
a pylon including opposed sidewalls within the by-pass duct, at least first forward and aft mounting sites adapted to connect the pylon to the gas turbine engine, at least second forward mounting sites adapted to connect the pylon to the nacelle structure, and at least one mounting site adapted for mounting the pylon to the aircraft;
wherein the sidewalls of the pylon are convergent in a radially inward direction to a lower extremity thereof adjacent the core cowl and thereby provide an upper bifurcation having an inverted triangular cross-section within the by-pass duct of the gas turbine engine;
opposed integral slider tracks disposed on the opposed sidewalls, opposed guide members disposed on the opposed sidewalls and spaced apart from the integral slider tracks, and hinge mounts disposed on the opposed sidewalls between the guide members and the integral slider tracks;
a translatable cowl comprising an arcuate body having radially inner and outer panels defining an internal cavity therebetween, the inner panels of the translatable cowl being supported by the slider tracks of the pylon and the outer panels of the translatable cowl being supported by the guide members of the pylon for translation of the translatable cowl between at least a forward, closed position and a rearward, deployed position;
an openable cascade structure comprising arcuate cascade segments that are each mounted in hinged relationship to the pylon with the hinge mounts, wherein the cascade structure is at least partially disposed within the internal cavity when the translatable cowl is in the closed position and exposed when the translatable cowl is in the deployed position;
a track or rail, provided on a cascade support member disposed generally diametrically opposed to the pylon, to support and direct movement of the translatable cowl, wherein the track or rail does not extend into the by-pass duct; and
wherein the by-pass duct does not comprise a lower bifurcation.

3. The integrated thrust reverser/pylon assembly according to claim 2 wherein the radially inner and outer panels of the translatable cowl are coupled at a rearward end, and wherein the radially inner panel is slidably engageable with the slider tracks.

4. The integrated thrust reverser/pylon assembly according to claim 3 wherein the radially inner panel includes an inner surface configured to form at least a portion of the by-pass duct of the aircraft engine assembly.

5. The integrated thrust reverser/pylon assembly according to claim 2 wherein the translatable cowl is independently translatable relative to the cascade structure.

6. The integrated thrust reverser/pylon assembly according to claim 3 wherein the radially outer panel comprises at least one element of a v-groove/v-blade attachment at a forward end thereof for axial engagement with the nacelle structure of the aircraft engine assembly.

7. The integrated thrust reverser/pylon assembly according to claim 2 wherein the cascade structure comprises at least one element of a v-groove/v-blade attachment at a forward end thereof for radial engagement with a structure of the aircraft engine assembly.

8. The integrated thrust reverser/pylon assembly according to claim 2 wherein the arcuate body is substantially continuous through about a 330° structure.

9. The integrated thrust reverser/pylon assembly according to claim 2 wherein the arcuate cascade segments of the cascade structure comprise first and second arcuate cascade segments each being mounted in independent hinged relationship with the pylon, wherein each of the first and second arcuate cascade segments is selectively movable between a closed, operational condition and an open, serviceable condition.

10. The integrated thrust reverser/pylon assembly according to claim 9 wherein the cascade structure includes a latch operable to engage the first and second arcuate cascade segments in the operational condition.

11. The integrated thrust reverser/pylon assembly according to claim 2 wherein the translatable cowl is selectively operably engageable with the cascade support member.

* * * * *